United States Patent [19]

Braginsky et al.

[11] 4,307,492
[45] Dec. 29, 1981

[54] APPARATUS FOR EXTRACTING MEAT OF SMALL CRUSTACEANS

[76] Inventors: Yakov I. Braginsky, ulitsa Moldagulovoi, 28, korpus 3, kv. 64; Igor V. Gultsev, ulitsa Malaya Schukinskaya, 15, kv. 78; Vladimir V. Lavrov, ulitsa Narodnogo Opolchenia, 23, korpus 1, kv. 63; Viktor A. Mitrofanov, bulvar Generala Karbysheva, 18, korpus 1, kv. 19; Nikolai A. Nikitushkin, ulitsa Volgina, 15, korpus 1, kv. 43; Jury F. Yaroshenko, Novo-Basmannaya ulitsa, 17, kv. 103; Vladimir P. Bykov, Chertanovskaya ulitsa, 1-A, korpus 1, kv. 84; Samuil S. Torban, ulitsa Bolshaya Polyanka, 30, kv. 305, all of Moscow, U.S.S.R.

[21] Appl. No.: 109,335

[22] Filed: Jan. 3, 1980

[30] Foreign Application Priority Data

Jan. 3, 1979 [SU] U.S.S.R. ............... 2698854

[51] Int. Cl.³ ........................................... A22C 29/02
[52] U.S. Cl. ........................................ 17/71; 17/46; 17/48
[58] Field of Search ............... 17/53, 71, 72, 73, 74, 17/46, 48, 51

[56]      References Cited
         U.S. PATENT DOCUMENTS 2,545,517  3/1951  Harris .................. 17/71 X
3,408,686 11/1968  Stephenson ............. 17/71
4,133,077  1/1979  Jasniewicz et al. ...... 17/71 X
4,148,112  4/1979  Marvin ................. 17/53

FOREIGN PATENT DOCUMENTS 2430095  1/1976  Fed. Rep. of Germany .......... 17/71
581918  11/1977  U.S.S.R. ...................... 17/71

Primary Examiner—Willie G. Abercrombie
Attorney, Agent, or Firm—McAulay, Fields, Fisher, Goldstein & Nissen

[57] ABSTRACT

The disclosed apparatus for extracting meat of small crustaceans comprises a mechanism for breaking up the shell of the crustaceans including a diffuser, and a mechanism for separating the meat from other components of the crustaceans. The separating mechanism includes a vertical vessel filled with a working fluid, communicating with a chamber for feeding the mixture of the meat with other components of the crustaceans, a line for removing the meat of the crustaceans and means for removing the rest of the components. The upper zone of the vertical vessel flares outwardly. The conduit connecting the mixture feed chamber with the vertical vessel is preferably located in the latter's upper zone. Preferably, a working fluid supply conduit is arranged at the central zone of the vessel. The lower zone of the latter, narrows downwardly and is connected with the meat removal line incorporating a liquid-type ejector. The outlet end of the line is situated above the top level of the working fluid in the vertical vessel. The mixture feed chamber has in the upper portion thereof a device for feeding the working fluid, with the diffuser underlying this device above the top level of the working fluid. The apparatus enables obtaining the meat of small crustaceans in the form of an integral lump of the muscular tissue, devoid of the shell, liver, lipids gastrointestinal tract and other components. The apparatus offers the simple and economically efficient technology of processing antarctic krill directly in the fishing area, to obtain an unconventional kind of food.

11 Claims, 3 Drawing Figures

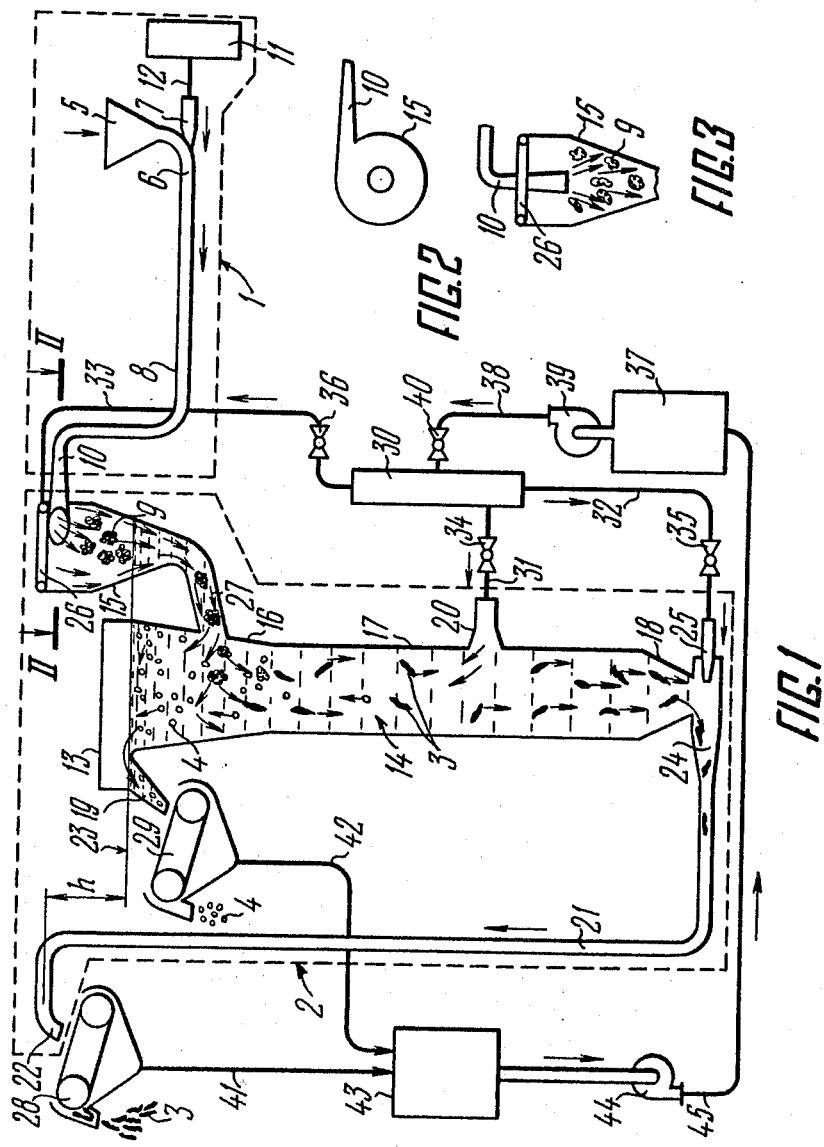

APPARATUS FOR EXTRACTING MEAT OF SMALL CRUSTACEANS

FIELD OF THE INVENTION

The present invention relates to the technology of processing sea products for use as food, and more particularly it relates to apparatus for extracting the meat of small crustaceans.

Although the invention is specifically intended for processing antarctic shrimps or krill, it may be also utilized in the fishing industry for processing sea and ocean shrimps. Furthermore, the invention can be employed in various fields of agricultural production and in the mixed feed industry.

BACKGROUND OF THE INVENTION

Antarctic skill is one of the most available large-scale sources of substantial expansion of the output of protein food of animal origin. The catch of krill may well surpass the total currently attained level of the catch of fish in the World Ocean. The most valuable component of the krill is its pure meat in the form of muscular tissue lumps. The chemical composition of the krill meat is similar to that of the meat of crabs and shrimps and includes various vital amino-acids and microelements. To use the krill meat as food, it has to be completely separated from the shell. Pure meat extracted from the krill has to have the minimum content of lipids, the remnants of the liver and of the contents of the gastrointestinal tract, which last-mentioned components affect the quality of the meat and its storability.

When one considers the great distances where the krill is caught and the long time it takes to carry the krill to the consumers, it is obvious that the krill should be processed directly in the catching areas into pure meat either as a ready-to-use produce (natural canned krill), or as a semi-finished product (fresh-frozen krill meat).

There are known apparatus for removing the shell of crustaceans, including a belt conveyer for feeding the crustaceans, a helical passage wherein the crustaceans are advanced by rotating discs having on their periphery sharp spikes breaking up the shell and separating it from the meat. Then the meat and the shell fragments are finally separated by flotation.

Apparatus of this kind enables obtaining the meat of shrimps in lumps: however, they are operable solely for processing shrimps of a relatively large size and would not be practically suitable for removing the shell of small crustaceans, e.g. ocean shrimps.

There is also known an apparatus for automatic removal of the shell of crustaceans (e.g. shrimps), including a charging mechanism in the form of a longitudinal belt conveyer, slit-type devices for sorting the crustaceans into fractions according to their size, the narrowing guides of a trough for indexing the crustaceans one by one, and a device for removing the shell, including a shell breaking-up mechanism and a unit for removing the shell fragments, an air conduit and a compressed air supply pipe.

In the known apparatus the crustaceans sorted according to their size are indexed into a predetermined position and directed one by one in an air stream into the shell-breaking channel where the shell is stripped by blades and knocked-off by shell-removing elements, whereafter the stripped shrimps are separated from the shell with the use of a fan.

In the known apparatus of this type it is necessary to classify the shrimps according to their size and to feed them for processing one by one, which curbs down the throughput of the apparatus. With each fraction of the corresponding size being directed for the processing into its own bin adjoined by an oval-section tubular passage corresponding to the contour of shrimps of the respective size, the apparatus has a relatively complicated structure.

There is further known an apparatus (cf. the U.S. Pat. No. 3,408,686; Cl. 17-2, dated 1968) for separating the heads of shrimps from their bodies, comprising a mechanism for breaking up the shrimps and a mechanism for separating the decapitated bodies of the shrimps from their heads, the legs or pleopods and their components.

The shrimp breaking-up mechanism includes a charging funnel, a vertical duct with guides and a horizontal duct with a stationary sharp blade or rib, a gate regulating a high-velocity jet, a wire scraper, means for decelerated the high-velocity jet and a pump for feeding the working fluid.

The mechanism for separating the decapitated body from the head, legs or pleopods and other components includes a vertical cylindrical vessel and a chamber for feeding the mixture.

The vertical cylindrical vessel includes a perforated partition, a settling pipe running axially of the vessel, a conduit opening into the central portion of the settling pipe, a trough communicating with the upper portion of the settling pipe and an inclined conduit for removing the bodies, accommodated under the lower portion of the settling pipe. The mixture-feeding chamber is a tank communicating with the vertical cylindrical vessel via an inclined pipe and a transfer tray.

The apparatus operates, as follows.

Crustaceans are fed into the charging funnel of the shrimp breaking-up mechanism where they fall down the vertical duct, and the guides direct them to become positioned vertically on the stationary sharp blade arranged at the intersection of the vertical and horizontal ducts. The high-velocity jet or stream of the working fluid is driven by the pump through the horizontal duct where it forces either the head or the body of a shrimp against the sharp blade, whereby the head becomes separated from the body. Then the high-velocity stream carries the body of the shrimp past the wire scraper which tears the legs or pleopods off the body. The high-velocity stream then carries out the mixture of the heads, bodies, legs or pleopods and other components of the shrimps from the shrimp breaking-up mechanism, and directs the mixture into the mechanism for separating the bodies from the rest of the components.

The process of separating the bodies from the other components is carried out, as follows.

The mixture in the stream of the working fluid gets into the mixture feeding chamber wherefrom it is guided along the inclined pipe and the transfer tray into the conduit communicating with the settling pipe of the vertical cylindrical vessel, the major portion of the working fluid flowing through the perforations of the transfer tray into the perforated paratition, to fill the vertical cylindrical vessel and to produce a uniform flow of the working fluid both within the vertical vessel and inside the settling pipe. The permament level of the working fluid in the vertical cylindrical vessel provides for a permanent flow rate or velocity within the settling pipe, in the inclined conduit for removing the bodies and in the trough. The separation of the bodies from the other components takes place within the settling pipe, owing to the upward flow of the working fluid having the sufficient viscosity for the ascending travel of the heads, legs or pleopods and other components, and the descending motion of the bodies. These decapitated bodies leave the settling pipe through its lower portion, get into the inclined conduit for removing the bodies and are carried away from the apparatus, whereas the rest of the components ascend along the settling pipe and are carried away through the trough.

The apparatus of the prior art is intended merely for decapitating the shrimps and enables separating their bodies, not the muscular tissue devoid of the shell, liver, gastrointestinal tract, and thus ready for use as food. The shell breaking-up mechanism is based on one by one decapitation, with the shrimps positively retained on the stationary sharp blade or rib, which reduces the throughput of the apparatus. The mixture-feeding chamber, the charging conduit, the settling pipe, the trough and the inclined body-removing conduit have to have maintained therein the constant rates or velocities of the flows of the working fluid, which complicates and opposes active control over the processes of the separation of the components. The self-sustained withdrawal of the working fluid separately carrying away the bodies and the rest of the components likewise complicates the continuous trouble-free performance of the apparatus.

Thus, the hitherto known apparatus for processing small crustaceans, solving as they do to different degrees the problem of yielding a product usable as food, offer limited capabilities of obtaining pure meat of small crustaceans. They would not enable introduction of an automated high-capacity process of treating the antarctic krill—the promising source of valuable food products.

BRIEF DESCRIPTION OF THE INVENTION

It is an object of the present invention to create an apparatus for extracting from small crustaceans, e.g. from the antarctic krill, the muscular tissue as pure meat fit for use as high-quality food either in the form of natural canned meat, or as fresh-frozen meat.

This object is attained in an apparatus for extracting the meat of small crustaceans, comprising a mechanism for breaking up the shell of the crustaceans, including a diffuser, and a mechanism for separating the meat from the rest of the components of the crustaceans, including a vertical vessel filled with a working fluid, a chamber for feeding the mixture of the meat and other components of the crustaceans, communicating with the vertical vessel via a conduit, a line for removing the meat of the crustaceans, and means for withdrawing the other components of the crustaceans, in which apparatus, in accordance with the present invention, the upper zone of the vertical vessel is of a flaring shape, with the conduit connecting the chamber for feeding the mixture with the vertical vessel being preferably arranged in the latter's upper zone, a conduit for supplying the working fluid being preferably arranged in the central zone of the vertical vessel, the lower zone of the vessel being of a narrowing shape and communicating with the inlet of the line for removing the meat of the crustaceans, the line incorporating a liquid-type ejector, the outlet end of the line for removing the meat of the crustaceans being situated above the top level of the working fluid in the vertical vessel, the chamber for feeding the mixture of the meat and other components of the crustaceans having in the upper portion thereof a device for supplying the working fluid, with the diffuser of the mechanism for breaking up the shell of the crustaceans underlying the last-mentioned device and being accommodated in the chamber for feeding the mixture of the meat and other components of the crustaceans above the level of the working fluid in the chamber.

To provide for the uniform supply of the working fluid into the chamber for feeding the mixture of the meat and other components of the crustaceans, and also for the working fluid to uniformly wash away the pieces of the mixture off the walls of the chamber, as well as for the uniform feed of the mixture into the vertical vessel, it is expedient that the device for supplying the working fluid into the chamber for feeding the mixture of the meat and other components of the crustaceans should be in the form of an annular manifold.

Depending on the physical and chemical parameters of the crustaceans to be processed, the time of their storage prior to processing and the way they have been prepared for processing, as well as on the parameters of the working agent used in the mechanism for breaking up the shell of the crustaceans, the diffuser may be arranged in the chamber for feeding the mixture of the meat and other components of the crustaceans either horizontally or vertically.

The disclosed apparatus enables processing of antarctic krill directly in the fishing region over within practically the entire range of sizes being caught, and without any preceding classification, indexing and one by one feeding of the crustaceans to be processed. The apparatus further offers a simple and economically attractive technology of processing small crustaceans on the industrial scale.

BRIEF DESCRIPTION OF APPENDED DRAWINGS

The above said and other objects of the present invention will become apparent from the following description of the embodiments thereof and from the appended drawings, wherein:

FIG. 1 illustrates schematically the general structure of the apparatus for extracting the meat of small crustaceans, embodying the invention;

FIG. 2 illustrates one modification of the arrangement of the diffuser of the mechanism for breaking up the shell of the crustaceans, according to the invention;

FIG. 3 illustrates another modification of the arrangement of the diffuser of the mechanism for breaker up the shell of the crustaceans, according to the invention.

DETAILED DESCRIPTION OF THE INVENTION

The apparatus for extracting the meat of small crustaceans comprises a mechanism 1 (FIG. 1) for breaking up the shell of the crustaceans, and a mechanism 2 for separating the meat 3 of the crustaceans from the rest of their components 4.

The mechanism 1 for breaking up the shell includes a charging funnel 5 and the shell breaking-up zone 6 adjoined by a nozzle 7 for feeding in the jet of the working agent. The mechanism 1 also includes a conduit 8 for feeding the mixture 9 of the meat 3 and other components 4 of the crustaceans, having at its outlet a diffuser 10 (FIGS. 1, 2 and 3), and the means 11 (FIG. 1) for supplying the working agent, connected to the nozzle 7 via a line 12.

The mechanism 2 for separating the meat 3 from the other components 4 of the crustaceans includes a vertical vessel 13 open at the top and filled with the working fluid 14, and a chamber 15 for feeding the mixture 9 of the meat 3 and other components 4, arranged above the vertical vessel 13. The latter has an upper zone 16, a central zone 17 and a lower zone 18, the upper zone 16 of the vertical vessel 13 flaring outwardly, and the lower zone 18 thereof narrowing inwardly. The upper zone 16 of the vertical vessel 13 is provided with means 19 for withdrawing the other components 4 of the crustaceans. Arranged at the central zone 17 of the vertical vessel 13 is a conduit 20 for supplying the working fluid 14. The lower zone 18 communicates with a conduit 21 for removing the meat 3, of which the outlet end 22 is arranged above the upper level 23 of the working fluid 14 in the vertical vessel 13, by an extent "h". A liquid-type ejector 25 is arranged at the inlet 24 of the conduit 21.

The chamber 15 for feeding the mixture 9 has in the upper portion thereof a device 26 for supplying the working fluid 14, overlying the diffuser 10 of the mechanism 1 for breaking up the shell of the crustaceans, which is accommodated in the chamber 15 above the level 23 of the working fluid 14. The chamber 15 communicates with the flaring upper zone 16 of the vertical vessel 13 via a pipe 27.

Underlying the outlet end 22 of the conduit 21 for removing the meat 3 is a mechanism 28 for separating the meat 3 from the working fluid 14, which in the presently described embodiment includes a screen belt conveyer, while the means 19 for withdrawing the other components 4 of the crustaceans overlies a mechanism 29 for separating these components 4 from the working fluid 14, which in the presently described embodiment likewise includes a screen belt conveyer. The conduit 20 for supplying the working fluid 14, the ejector 25 and the device 26 for supplying the working fluid 14 communicate with a manifold 30, respectively, via lines with valves 34, 35, 36. The working fluid supply manifold 30 is connected to a working fluid tank 37 via a line 38 incorporating a pump 39 for feeding the working fluid 14 into the mechanism 2 for separating the meat 3 from the other components 4, and a control valve 40.

The mechanism 28 for separating the meat 3 from the working fluid 14 and the mechanism 29 for separating the other components 4 of the crustaceans from the working fluid 14 communicate, respectively, via lines 41 and 42 with a system 43 for purifying or regenerating the working fluid 14, including a pump 44 and a line 45 for returning the working fluid 14 into the supply tank 37.

The diffuser 10 of the mechanism 1 for breaking up the shell enters the chamber 15 (FIG. 1) for feeding the mixture 9 of the meat 3 and other components 4 either horizontally (FIG. 2) or vertically (FIG. 3).

The apparatus operates as follows.

The working fluid 14 (FIG. 1) is supplied from the tank 37 by the pump 39 via the line 38 into the manifold 30, with the valve 40 being operated to control the feed rate of the working fluid 14. From the manifold 30 the working fluid 14 flows via the lines 31 and 33, respectively, into the conduit 20 and the device 26, to fill the vertical vessel 13 to the level 23. The respective valves 34 and 36 are operated to control the rate or velocity of the flows of the working fluid 14 in the vertical vessel 13 and in the chamber 15 for feeding the mixture 9 of the meat and other components.

The mechanism 1 for breaking up the shell is engaged for operation by energizing the means 11 for feeding the working agent. The working agent may be compressed air, steam, liquid, steam-water and air-water mixtures of the appropriate velocity and temperature parameters. While flowing from the means 11 via the line 12 into the jet nozzle 7 and emerging from the nozzle 7 in a high-velocity jet, the working agent creates suction in the zone 6, which draws the crustaceans charged into the funnel 5 for the further processing. In the zone 6 of the shell breaking-up mechanism 1 the crustaceans are subjected to the action of the high-velocity stream of the working fluid flowing about the crustaceans with a relative speed sufficient to create a pressure drop across the internal cavity and the external surface of the crustaceans, whereby the pressure within the internal cavity momentarily explodes the shell and severs the ties between the meat (the muscular tissue) 3 and the rest of the components 4 of the crustaceans. Then the mixture 9 of the meat and other components is supplied along the conduit 8 into the diffuser 10 wherein the velocity of the working agent and of the mixture 9 of the meat and other components is reduced. With the diffuser 10 arranged above the top level 23 of the working fluid 14, the resistance of the conduit 8 is reduced, whereby reliable performance of the shell breaking-up mechanism 1 is provided for, and the mixture 9 of the meat and other components may be fed uniformly into the vertical vessel 13.

The diffuser 10 may enter the chamber 15 either horizontally (FIG. 2) or vertically (FIG. 3). The actual arrangement of the diffuser 10 (FIG. 1) in the chamber 15 is selected in accordance with the physical and chemical characteristics of the crustaceans to be processed, the time of their storage prior to the processing, and also to the kind and parameters of the working agent employed in the mechanism 1 for breaking up the shell of the crustaceans.

The mixture 9 of the meat and other components of the crustaceans is supplied from the diffuser 10 into the chamber 15 of the mechanism 2 for separating the meat 3 from the other components 4 of the crustaceans, where it is entrained by the flow of the working fluid 14 emerging from the device 26 and carried thereby into the vertical vessel 13, the feed rate of the working fluid 14 into the device 26 being adjusted with the use of the valve 36.

The device 26 for feeding the working fluid 14 into the chamber 15 is in the form of an annular manifold. This provides for the uniform feed of the working fluid 14 into the chamber 15, for reliable washing away by the working fluid 14 of the particles of the mixture 9 off the walls of the chamber 15 and for the uniform feed of the mixture 9 into the vertical vessel 13.

Then the liquid ejector 25 is engaged into operation by feeding the working fluid 14 thereinto from the manifold 30 via the line 32 and adjusting the flow rate or velocity of the working fluid 14 in the conduit 21 for removing the meat 3 with the control valve 35, so that the extent "h" of the height of the outlet end 22 of the conduit 21 above the upper lever 23 of the working liquid 14 in the vertical vessel 13 should be sufficient for creating a permanent backwater head of the working fluid 14 in the conduit 21. The extent "h" is adjusted depending on the velocities of the flows of the working fluid 14 in the vertical vessel 13.

With the upper zone 16 of the vertical vessel having the flaring shape, the velocities of the flows of the working fluid 14 in the upper zone 16 and in the central zone 17 even out, and the mixture 9 of the meat and other components becomes uniformly distributed in the upper zone 16.

Following the engagement into operation of the conduit 20 for supplying the working fluid 14 and of the liquid ejector 25, there is set in the vertical vessel 13 a uniform ascending flow of the working fluid 14, the velocity or rate of this flow being set so that it should be slower than the rate of the descent of the meat 3, but higher than the rate of the gravity descent of the particles of the other components 4 of the crustaceans. This provides for the meat 3 descending into the lower zone 18 of the vertical vessel 13, to be taken up by the flow of the working fluid 14 produced by the ejector 25 and carried via the conduit 21 into the mechanism 28 for separating the meat 3 from the working fluid 14. The particles of the other components 4 of the crustaceans are carried upwardly into the upper zone 16 of the vertical vessel 13 and, upon having ascended to the top level 23 of the working fluid 14, are directed by the means 19 into the mechanism 29 for separating the other components 4 from the working fluid 14.

Should the mixture 9 contain disintegrated particles of the meat 3, such particles would be also taken up by the upward flow of the working fluid 14 and withdrawn together with the other components 4 of the crustaceans, which is another proof of the high efficiency of the process of separating lumps of pure meat 3 from the rest of the components 4 of the crustaceans.

Depending on the properties, dimensions and physical and chemical characteristics of the crustaceans, as well as on the kind and parameters of the working agent used in the mechanism 1 for breaking up the shells of the crustaceans, the ratio of the respective feeds of the working fluid 14 into the conduit 20, the ejector 25 and the device 26 is adjusted, and in each individual case the extent "h" of the height of the outlet end 22 of the conduit 21 and of the top level 23 of the working fluid 14 is also adjusted. In this way there is ensured stability of the process of the separation of the meat 3 from the rest of the components 4 of the crustaceans and reliability of the operation of the apparatus.

The time of the contact of the meat 3 of the crustaceans with the working fluid 14 throughout the entire operating cycle of the process of the separation of the meat 3 from the other components 4 of the crustaceans depends on the throughput of the apparatus and amounts to not more than 30 seconds, which provides for unaffected taste of the meat 3 of crustaceans.

In the mechanism 28 the meat 3 of the crustaceans is separated from the working fluid 14, while in the mechanism 29 the rest of the components 4 of the crustaceans are likewise separated from the working fluid 14. This working fluid 14 is directed via the lines 41 and 42 into the purifying (regenerating) system 43 wherefrom the pump 44 returns the working fluid 14 into the supply tank 37 via the line 45. In this way the working fluid 14 is recirculated through the systems of the apparatus.

The herein disclosed apparatus is of a high capacity and throughput, and is capable of processing small crustaceans of any size without any prior classification and indexing of individual crustaceans. The simplicity of the design of the apparatus, the ease of its maintenance and sanitary treatment are obvious, as is the free accessibility of its units.

The apparatus is devoid of sharp teeth and scrapers intended to break up the shell, which enables obtaining pure meat of crustaceans with minimum disintegration, and, hence, with minimized loss.

The structure of the apparatus provides for active control of the operating modes and duties and is readily susceptible to all-through automation of the continuous process of treating crustaceans.

The pure meat 3 of the crustaceans, yielded by the disclosed apparatus, may be directed to be processed either into canned meat or into fresh-frozen produce, while the rest of the components 4 may be processed into such valuable commercial products as chitin and chitasane, or else into animal feed, in which way complete utilization of small crustaceans is enabled.

The small crustaceans, and the antarctic krill in particular being the new object of massive catches, the industrial implementation of the disclosed apparatus opens economically attractive prospects.

What we claim is:

1. An apparatus for separating the meat from small crustaceans of the type having a shell with an internal cavity containing meat and other material, comprising:
   means for removing and separating said meat and other material from said shell to produce a mixture of meat, other material and shell;
   a vessel containing a working fluid;
   means for adding said mixture to said working fluid at a first height in said vessel;
   means for supplying a flow of working fluid to said vessel at a second height lower than said first height;
   means above said first height for permitting an excess of said working fluid to overflow said vessel;
   means for removing meat from said vessel at a third height lower than said second height.

2. An apparatus according to claim 1 wherein said means for removing includes explosively reducing a pressure surrounding said small crustaceans whereby a pressure in said internal cavities explodes and severs ties between said meat and other material and removes said meat and other material from said shell.

3. An apparatus according to claim 2 wherein said means for explosively reducing a pressure includes a high-velocity stream of said working fluid.

4. An apparatus according to claim 3 wherein said means for adding includes a diffuser receiving said mixture and said working fluid from said means for removing;
   said means for supplying including means for adjusting said flow to a value which provides an upward flow of said working fluid in said vessel above said second height which is sufficient to carry said shell and other material upward therewith and is small enough to permit said meat to descend through said working fluid to said third height whereby said shell and other material overflows with said excess of said working fluid and said meat is removed at said third height.

5. An apparatus according to claim 4 wherein said means for adding further includes a chamber for receiving said mixture from said diffuser, and an annular manifold for supplying working fluid to said chamber.

6. An apparatus according to claim 5 wherein said diffuser is effective to enter said mixture into said chamber substantially horizontally.

7. An apparatus according to claim 6 wherein said diffuser is effective to enter said mixture into said chamber vertically.

8. An apparatus according to claim 1 wherein said apparatus further comprises means for regenerating said working fluid.

9. An apparatus for separating the meat from small crustaceans of the type having a shell having an internal cavity containing meat and other material, comprising:
  means for explosively reducing a pressure surrounding said small crustaceans whereby a pressure in said internal cavity explodes and severs ties between said meat and other material and removes said meat and other material from a said shell to form a mixture of said meat, other material and shell;
  means for adding said mixture to a vessel containing a working fluid; and
  means for separating said meat in said working fluid from said shell and other material in said working fluid.

10. An apparatus according to claim 9 wherein said means for explosively reducing a pressure includes a high-speed jet of said working fluid.

11. An apparatus according to claim 9 wherein said means for separating includes means for producing an upward flow of said working fluid in said vessel at a rate effective to carry said shell and other material upward and to permit said meat to descend.

* * * * *